Patented Mar. 24, 1931

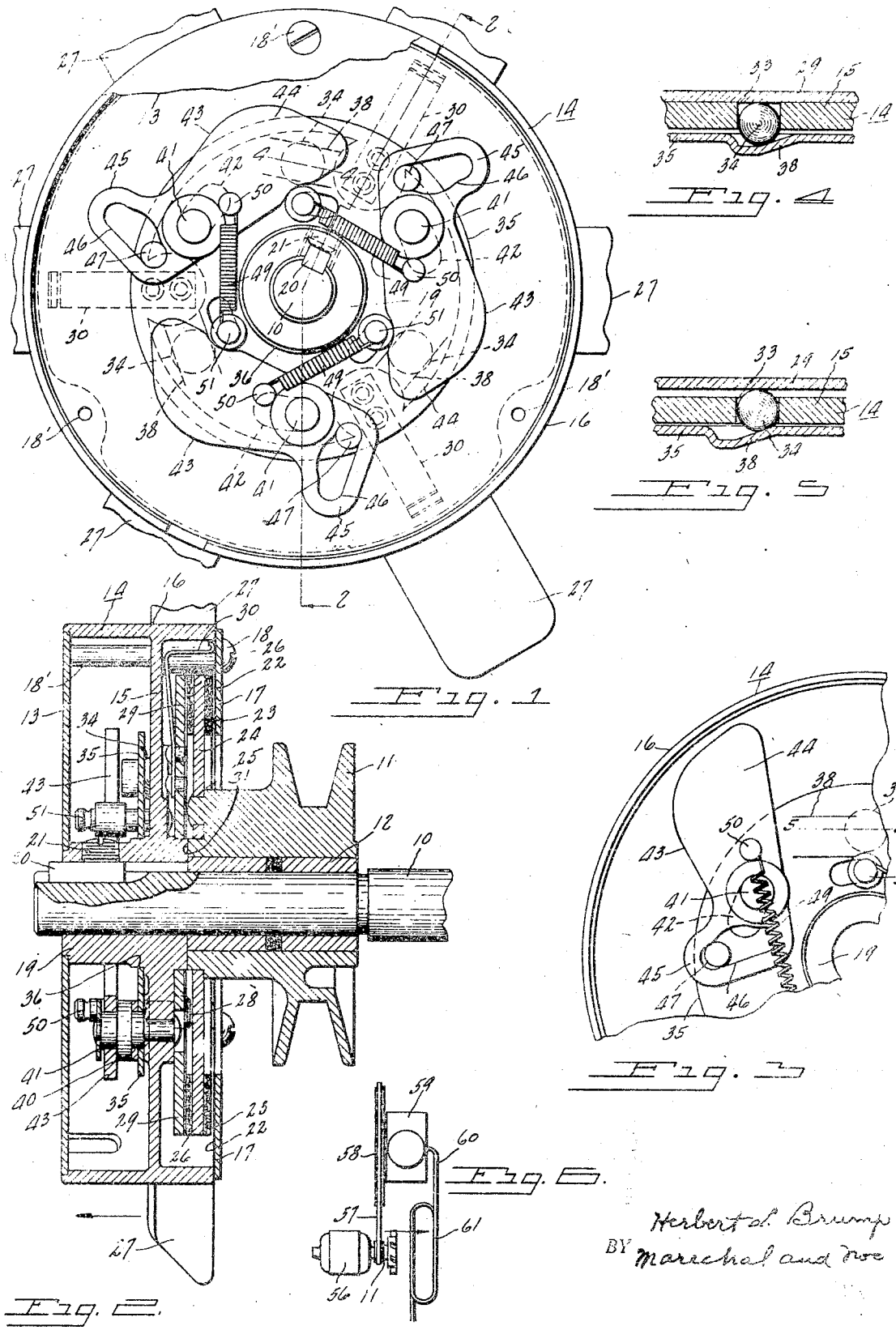

1,797,820

UNITED STATES PATENT OFFICE

HERBERT L. BRUMP, OF DAYTON, OHIO, ASSIGNOR, BY MESNE ASSIGNMENTS, TO DELCO PRODUCTS CORPORATION, OF DAYTON, OHIO, A CORPORATION OF DELAWARE

CLUTCH

Application filed May 11, 1928. Serial No. 277,051.

This invention relates to friction clutches and more particularly to centrifugally operated friction clutches adapted to be automatically engaged or disengaged by centrifugal weight means.

The primary object of the invention is the provision of a clutch construction of this character, which is formed of cheap, simple and easily manufactured parts, and which is easily assembled and efficient in operation.

Another object is the provision of a clutch adapted to connect an electric motor to a refrigerating compressor, the clutch being provided with fan blades to direct a stream of air away from the motor and towards the refrigerating condenser coils.

Other objects of the invention will be apparent from the following description and the accompanying drawings in which—

Fig. 1 is a front elevation of a clutch embodying the present invention;

Fig. 2 is a central vertical section of the clutch on the line 2—2 of Fig. 1;

Fig. 3 is a front elevation of a portion of the clutch showing the latter in clutch-engaged position;

Fig. 4 is a section on the line 4—4 of Fig. 1;

Fig. 5 is a section on the line 5—5 of Fig. 3; and

Fig. 6 is a graphic representation of the clutch embodied in a compressor drive for refrigerating apparatus.

Referring more particularly to the drawings by reference numerals a clutch embodying the present invention is shown applied to shaft 10 of an electric motor. The driven member of the clutch is shown in the form of a V-type pulley wheel 11 in which is pressed a bushing 12 which is freely rotatable on the shaft and which is permitted a limited endwise movement on the shaft. Fixed adjacent one end of the shaft 10 is a driving clutch housing 14, of substantially cylindrical shape and embodying an end wall 13, a peripheral portion 16, and a hollow circular end plate 17 which is held firmly in place on the peripheral portion by means of the bolts or screws 18. Bolts 18' serve to fasten the end wall 13 to the portion 16 as shown. The housing 14 also comprises a central wall 15 which has a central enlargement or hub portion 19 which is keyed or otherwise fixedly attached to the shaft as by means of key 20 and set-screw 21. The end plate 17 has an inner surface 22 which forms a driving clutch face and which is engaged by a cork or other friction clutch face 23 provided on a flat disk 24 which is firmly attached by means of the rivets 25 to the inner side of the driven pulley wheel 11. The disk 24, forming the driven clutch member, is provided with a second cork or other friction face 26 the latter being adapted to be engaged by a plate 29 which is slidably mounted for axial movement on pins 28 extending from the wall 15 so that it is constrained to rotate with the housing 14.

The plate 29 is normally adjacent the side of the wall 15 of the housing and leaf springs 30, riveted to the plate bear yieldingly against the end plate 17 to normally hold it out of engagement with the revolving clutch face 26 and prevent rattling of the parts when the clutch is disengaged. In this position sufficient clearance is provided between the cork faces 26 and 23 and the inner sides of the plate 29 and the end plate 17. The plate 29 is adapted to be moved towards the driven clutch plate 24 so that this plate is slightly moved to the right as viewed in Fig. 2 until the cluch faces 22 and 23 engage. During this movement the driven wheel 11 of the clutch slides slightly to the right on the drive shaft 10 and away from the stop surface 31 which limits the left-hand movement of the parts 24, 11 and 12 and locates the driven clutch member or disk in a free running position when the clutch is disengaged.

The wall 15 of the clutch housing is provided with a series of holes 33 spaced symmetrically about the axis of the shaft 10, the embodiment illustrated showing three of these holes. They are of sufficient size to slidingly receive the rollers or balls 34 which are somewhat larger in diameter than the thickness of the adjacent part of the wall 15 so that they project in their normal positions from the outer face of this wall. The balls are thus fixed in definite radial positions but are permitted to move in directions parallel to the axis of rotation of the clutch parts, and are moved to press against the plate 29 to engage the clutch by means of a cam plate 35 which is provided with a central opening 36 rotatably mounted on the hub portion of the clutch housing. This cam plate is in the form of a flat circular disk, having outwardly stamped bulges forming inclined projections 38, one for each of the balls 34. In the normal position of the clutch plate, see Fig. 4, the projections 38 provide for only a limited clearance of the balls 34 when the plate 29 is against the wall 15 of the clutch housing. It will be obvious that when the cam plate 35 is rotated in a counter-clockwise direction from the position shown in Fig. 1, the balls will be forced inwardly as shown in Figs. 3 and 5 to cause engagement of the clutch. Endwise movement of the cam plate 35 towards the left as viewed in Fig. 2 is prevented by shoulders 40 provided on studs 41 which are fixed to the wall 15 of the clutch housing and which project through slots 42 in the cam plate 35, these slots being sufficiently long to permit the cam plate to be moved the normal position to a clutch-engaging position as shown in Fig. 3.

The clutch is adapted to be engaged automatically at a certain predetermined speed by means of centrifugally actuated weight members 43 which are herein shown as three in number. These weight members are pivotally mounted on the studs 41 and are provided with weighted portions 44 so that these weighted portions may be moved outwardly by centrifugal force when the proper speed of revolution of the clutch is attained. Extensions 45 on the weights are provided with cam slots 46 by which the pins 47 which are fastened to the cam plate 35 are actuated. The slots 46 are designed so that when the weighted ends of the weight members move outwardly the cam plate will be moved counter-clockwise to the position shown in Fig. 3, such actuation of course causing the engagement of the clutch. Preferably the slots are designed to provide for an initial outward movement of the weights from their normal inner positions without operating or turning the cam plate, the latter part of the weight movement being effective to cause the engagement of the clutch quickly and in a definite manner. Thus as seen in Fig. 1 the openings in the weights have a portion with an arcuate curvature concentric with the weight pivots so that no movement of the pins 47 takes place during the initial outward movement of the weights. During the last portion of the weight movement, however, the pins are cammed away from the weight pivots, the slots being designed to effect this movement. The weight members and the cam plate 35 are returned to their normal positions when the speed or rotation of the clutch falls below a predetermined speed by means of tension springs 49 which are fixed to pins 50 projecting from the weight members 43 and to pins 51 on the housing 15, these pins projecting through arcuate slots in the cam plate. These springs 49 operate to return the actuating weights and thereby rotate the cam plate, to their normal inoperative positions.

The pins 50 on the movable weights are so located in relation to the pivot studs 41 that as the weights move out the restraining effect of the springs 49 does not increase as the springs lengthen. Although the spring pull increases the pull of the spring is in a plane which approaches the stud 41 as the weights move out, and consequently as the centrifugal force on the weight increases it will move out rather suddenly at the proper speed and will remain in the clutch-engaged position until the speed of rotation falls considerably below that required to cause its initial outward movement.

It will be apparent that the various parts of the clutch construction are all simple in design and are easily and cheaply made, assembled or disassembled. The cam plate for example is merely a flat disk stamping having portions pushed out to one side angularly inclined to the otherwise flat plate. The simplicity of the clutch causes effective and reliable operation in causing the engagement of the driving and the driven members when the operating speed of rotation of the driving member is attained.

Fig. 6 represents rather diagrammatically an arrangement in which a clutch of the general character previously described is employed in a refrigerating system. In this embodiment the driving shaft 10 is rotated by an electric motor 56, the driving member 14 of the clutch transmitting power, when the clutch is engaged, to the driven pulley-wheel 11. This pulley-wheel is connected as by means of a belt 57 to the fly-wheel 58 of a fluid compressor 59. This fluid compressor is connected to a fluid pipe 60 which is coiled at 61, in front of the motor, and in the line of the motor axis. As previously mentioned the driving member 14 of the clutch carries air blades 27, these blades being arranged to direct a blast of air in the direction of the arrows shown in Figs. 2 and 6, so that a cooling air stream is directed toward the coil 61 of the refrigerating apparatus, it being understood that the coil 61 is for the purpose of the condensation of the refrigerant in the system. The motor 56, which is preferably of the split-phase type, may be started to start the operation of the compressor 59 after the motor has reached its approximate operating speed, at which time the clutch automatically operates to start the operation of the compressor. When in operation it will be apparent that the clutch on the end of the motor acts to cool the condenser coils 61.

While the form of apparatus herein described constitutes a preferred embodiment of the invention, it is to be understood that the invention is not limited to this precise form of apparatus, and that changes may be made therein without departing from the scope of the invention which is defined in the appended claims.

What is is claimed is:

1. A clutch comprising a driving member, a driven member, a pair of engageable clutch faces, means fixing one of said faces for rotation with each of the members, a series of balls carried directly by one of the members and guided therein for movement in directions parallel to the axis of rotation of said members, a cam plate rotatably mounted about the axis of rotation of the driving member for moving said balls to press the clutch faces together, and pivotally mounted weight means mounted on the driving member so as to move outwardly under the action of centrifugal force to move the cam plate to clutch engaging position.

2. A clutch comprising a rotatable driving member, a rotatable driven member in alignment therewith, a pair of engageable disk clutch faces, means fixing one of said faces for rotation with each of the members, a series of balls carried directly by the driving member, said member having a series of holes symmetrically arranged about its axis of rotation in which the balls are bodily movable, a flat cam plate rotatably mounted about the axis of the driving member and having offset portions adapted to engage the balls to press the clutch faces together, pivotally mounted weight means mounted on the driving member and adapted to move outwardly under the influence of centrifugal force, a cam connection between the weight means and the cam plate, and spring means operably connected to the said weight means for returning the latter to normal position upon disengagement of the clutch.

3. A clutch comprising a rotatable driving member, a rotatable driven member, a pair of engageable clutch faces, means fixing one of said clutch faces for rotation with one of the said members, a series of balls carried in definite radial positions by the other member, a cam plate rotatably mounted about the axis of the driving member for moving said balls to press the clutch faces together, weight means pivotally mounted on the driving member adapted to move under the influence of centrifugal force, said weight means having a pin and slot connection with the cam plate, spring means for returning the weight means and the cam plate to a normal position, said cam plate comprising a flat metal disk having outwardly extending cam projections inclined to the face of the disk adapted to engage the balls to move them in directions substantially parallel to the axis of the cam plate.

4. A clutch comprising a rotatable driving member, a rotatable driven member, a driven clutch disk fixed to said driven member said driving member enclosing said clutch disk and providing a clutch face engageable therewith, a series of rotatable elements guided for movement in the driving member, a cam plate rotatably mounted on the driving member and having projections inclined to the surface of the plate adapted to engage the said elements to press the clutch faces together, centrifugal means for operating said cam plate, and a connection between the said centrifugal means and said cam plate for causing rotation of the cam plate upon movement of the centrifugal means.

5. A clutch comprising a rotatable driving housing of substantially cylindrical form, a clutch face on said housing, a driven clutch member enclosed within said housing, a driven member fixed to said driven clutch member, said housing having a wall with a series of holes therein, rotatable elements guided in said holes and movable in a direction substantially parallel to the axis of rotation of said housing, a cam plate rotatably mounted on said housing and having inclined projections engaging said rotatable elements, a series of weights pivoted to said housing and adapted to move outwardly under the action of centrifugal force, and operating connections between said weights and said cam plate to rotate the latter and engage or disengage the clutch.

6. A clutch comprising a driving shaft, a driving clutch housing fixed to said shaft, a driven clutch member enclosed by said housing, a driven member fixed to said driven clutch member and mounted on said shaft for rotational movements thereon, said housing having a wall provided with a series of holes, balls arranged in said holes and projecting somewhat beyond the outer face of said wall, a cam plate rotatably mounted concentrically with said housing and having outwardly inclined surfaces engaging said balls to cause the driven clutch member to engage the housing, a series of weight members pivoted to said housing, spring means operably connected to said weight members to retain the same in normal position, and pin and slot connections between said weight members and said cam plate to rotate the cam plate as the weight members are affected by centrifugal force.

7. A clutch comprising a driving shaft, a driving clutch housing fixed to said shaft, a driven clutch member enclosed by said housing, a driven member fixed to said driven clutch member and mounted concentrically with said shaft for rotational movements thereon, said housing having a wall provided with a series of holes, balls arranged in said holes and projecting somewhat beyond the outer face of said wall, a pressure plate fixed against rotation on said housing, a cam plate rotatably mounted concentrically within said housing and having outwardly inclined surfaces engaging said balls to cause the driven clutch member to be engaged by the housing and said pressure plate, a series of weight members pivoted to said housing, spring means operably connected to said weight members to retain the same in normal position, and pin and slot connections between said weight members and said cam plate to rotate the cam plate as the weight members are affected by centrifugal force.

In testimony whereof I hereto affix my signature.

HERBERT L. BRUMP.